(12) United States Patent
Barendregt et al.

(10) Patent No.: US 9,347,206 B2
(45) Date of Patent: May 24, 2016

(54) VARIABLE BYPASS PIPELINE HEATER

(71) Applicant: Certek Heat Machine USA, LLC, Grand Junction, CO (US)

(72) Inventors: Jeremy Barendregt, Grand Prairie (CA); Caleb Barendregt, Wembley (CA)

(73) Assignee: Certek Heat Machine Inc., Wembley (CA)

( * ) Notice: Subject to any disclaimer, the term of this patent is extended or adjusted under 35 U.S.C. 154(b) by 505 days.

(21) Appl. No.: 13/862,952

(22) Filed: Apr. 15, 2013

(65) Prior Publication Data

US 2014/0305613 A1    Oct. 16, 2014

(51) Int. Cl.
*F16L 53/00* (2006.01)
*E03B 7/12* (2006.01)

(52) U.S. Cl.
CPC .. *E03B 7/12* (2013.01); *F16L 53/00* (2013.01)

(58) Field of Classification Search
USPC ............... 138/33, 35, 38; 165/67, 104.11, 96
See application file for complete search history.

(56) References Cited

U.S. PATENT DOCUMENTS

| | | | | |
|---|---|---|---|---|
| 2,011,100 A | * | 8/1935 | Woods | F16L 53/00 137/339 |
| 2,107,933 A | * | 2/1938 | Crockett | B60H 1/22 122/26 |
| 3,283,123 A | * | 11/1966 | Atkinson | F16L 53/007 138/33 |
| 3,744,554 A | * | 7/1973 | Hasselrus | F24D 19/1006 165/259 |
| 3,756,268 A | * | 9/1973 | Lefever | F16L 1/026 137/340 |
| 4,286,613 A | * | 9/1981 | Lacoste | E03B 7/10 137/317 |
| 4,397,303 A | * | 8/1983 | Stultz | F24J 2/07 126/651 |
| 5,027,842 A | | 7/1991 | Powers | |
| 6,070,615 A | * | 6/2000 | Chen | F16L 53/008 138/104 |
| 2012/0017575 A1 | * | 1/2012 | Sloss | F01N 5/02 60/320 |

FOREIGN PATENT DOCUMENTS

CN    201163100 Y    10/2008
CN    202304510 U    7/2012

OTHER PUBLICATIONS

Canadian Intellectual Property Office (ISA/CA), International Search Report and Written Opinion of PCT/IB2014/001241 as completed Sep. 22, 2014, total 7 pgs.

* cited by examiner

*Primary Examiner* — James Hook
(74) *Attorney, Agent, or Firm* — Barclay Damon, LLP

(57) ABSTRACT

A fluid heating system for heating fluid flowing in a pipe to prevent freezing and ice build up. A controllable variable flow heat exchanger is utilized within the pipe to provide thermal transfer to the fluid flow.

14 Claims, 2 Drawing Sheets

VARIABLE BYPASS PIPELINE HEATER

FIELD OF THE INVENTION

This invention relates to preventing ice buildup in a fluid transport pipeline. More particularly, the invention relates to warming a fluid inside of a transport pipeline.

BACKGROUND OF THE INVENTION

In particular climates it is desired to heat, thaw and prevent the freezing of pipelines. The pipelines are used to transfer fluids, such as water or oil, across a distance, sometimes through areas of cold weather. Presently, heat exchangers are used to keep the fluid in the pipeline from freezing. However, heat exchangers require that the fluid in the pipeline be flowing in order to be effective. Once the fluid stops moving, the heat exchanger is unable to heat the fluid thereby making the system ineffective. Another method to heat fluid in a pipeline is to heat the exterior of the pipeline, which requires the installation of heated lines on the pipe. However, these transfer lines are generally inefficient as much of the heat is lost to the ambient air.

Yet another method is to insert a device into the line and use a vacuum to draw the fluid from the line. Once drained the fluid is heated and pumped back into the pipeline. This method is both very labor intensive and requires the special equipment such as vacuum trucks.

Therefore, a system for keeping high volumes of fluid from freezing is desired. Further, a system for keeping fluids from freezing with minimal intervention (disassembly of pipelines, draining and down time) is desired. Even further, a system to provide safe, continuous heat over long distance pipelines, and which is transportable to remote locations as a unit is desired.

SUMMARY OF THE INVENTION

In one form the invention relates to a fluid heating system which may be installed into a pipeline along the length of the pipeline. The fluid heating system is capable of being transported to a pipeline location and to heat fluid flowing through the pipeline. Flowing pipeline fluid may be diverted in a variable amount to be heated in an attached heat exchanger and then returned to the pipeline flow.

In one embodiment, the invention includes a fluid heating system having a pipe comprising a fluid input and a fluid output for connecting to a pipeline. A heat exchanger is connected to the pipe via an inlet and an outlet. The heat exchanger inlet diverts a fluid flowing in the pipe into a heat exchanger interior compartment to be heated and then returned from the heat exchanger back to the pipe. A heating line within the heat exchanger interior compartment includes a heated fluid circulating therethrough for heating the diverted fluid.

In yet another embodiment, the invention includes a method of heating a fluid flowing in a pipeline, wherein fluid flowing in the pipeline is diverted into an interior compartment of a heat exchanger. The diverted fluid typically requires heating to increase its current temperature. Heated fluid is circulated in a closed heating line within the heat exchanger, wherein the diverted fluid flows through the heat exchanger in physical contact with the heating line and is thereby heated. The heated diverted fluid is returned back to the pipeline flow.

In yet another embodiment, the invention includes a transportable fluid heating system having a pipe section with a fluid input and a fluid output each having a flange connected thereto for being connected to a pipeline. A heat exchanger is connected to the pipe in two places via a heat exchanger inlet and outlet. A valve installed in the pipe diverts fluid flowing in the pipeline through the heat exchanger inlet. A closed heating line within the heat exchanger receives a fluid heated to a temperature higher than the diverted fluid. The heated fluid circulates through the heating line for transferring heat from the heated fluid to the diverted fluid. A frame made from a plurality of rigid members is attached to the heat exchanger and to the pipe for securely supporting the heat exchanger and the pipe, and for lifting and transporting the fluid heating system.

BRIEF DESCRIPTION OF THE DRAWINGS

The present invention is disclosed with reference to the accompanying drawings, wherein.

Corresponding reference characters indicate corresponding parts throughout the several views. The examples set out herein illustrates several embodiments of the invention but should not be construed as limiting the scope of the invention in any manner.

DETAILED DESCRIPTION

Figure 1:
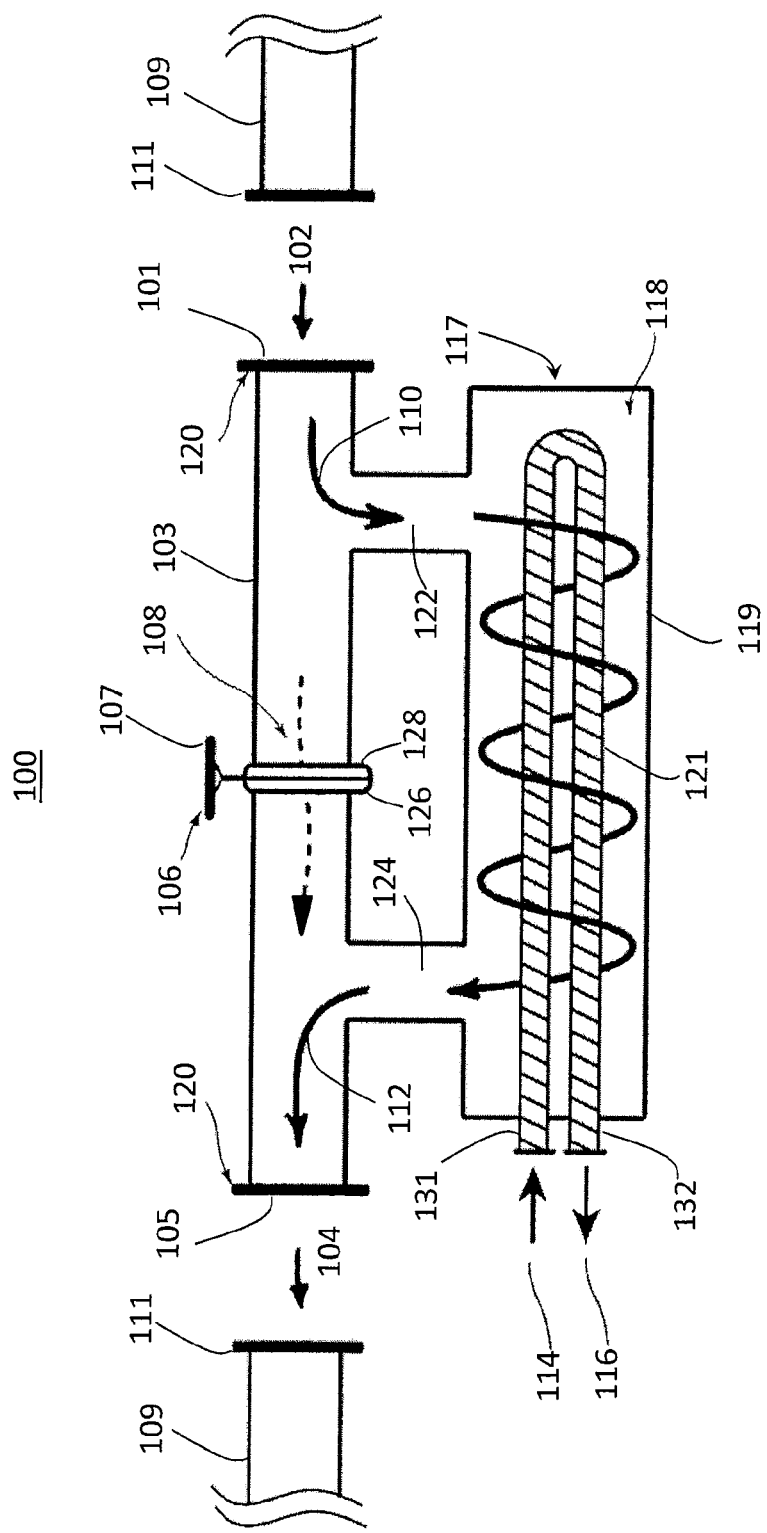
FIG. 1 is an exemplary fluid schematic illustration of one embodiment of a fluid heating system.
Figure 2:
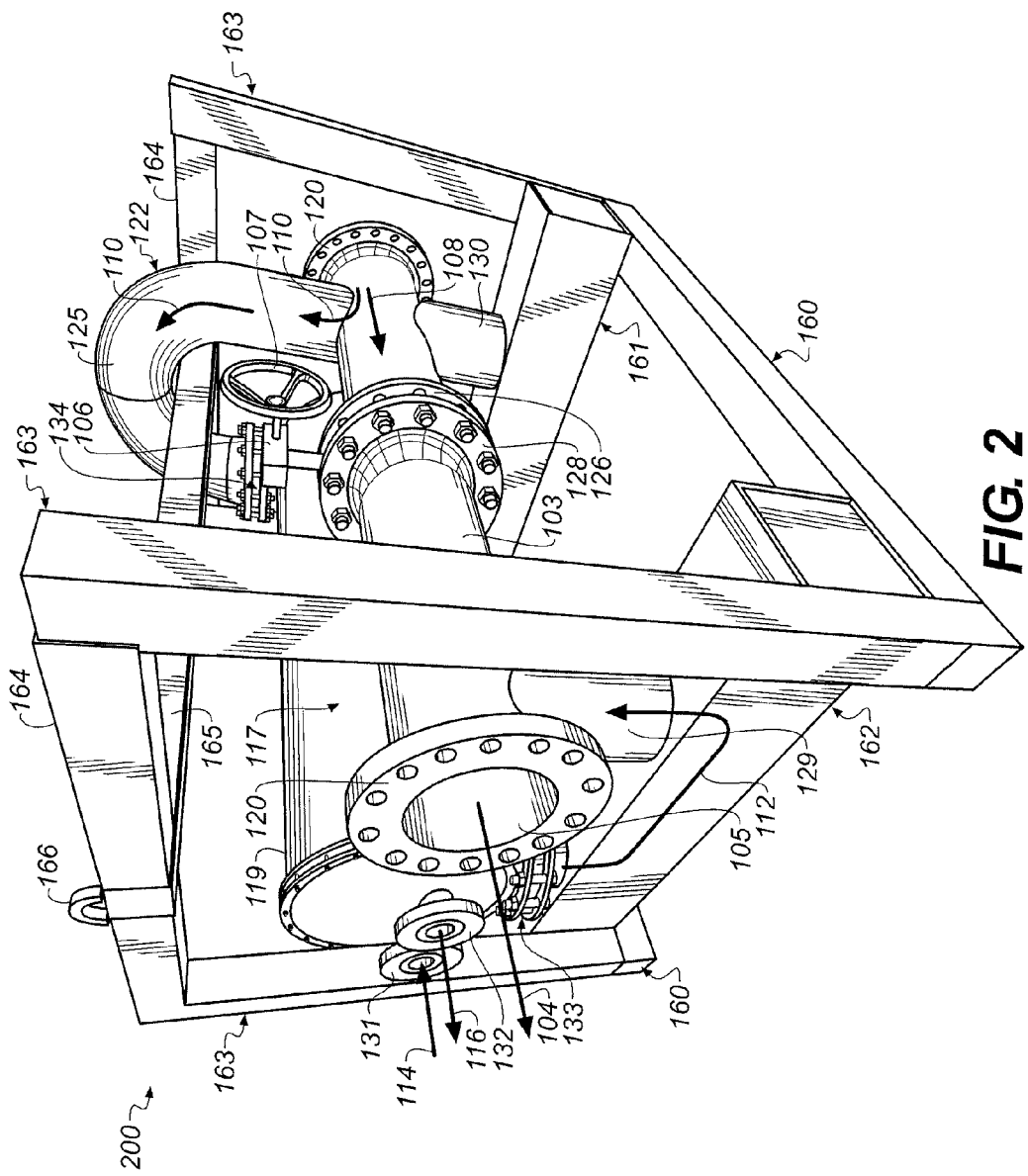
FIG. 2 is an expanded isometric view of a transportable framed fluid heating system according to one embodiment.

Referring generally to FIGS. 1-2, there is shown a fluid heating system 100 for integration with fluid carrying pipelines according to one embodiment. To heat the fluid flowing in a pipeline, a transportable fluid heating system 100 is connected in line between sections of pipeline to allow integration of the heating system therein. The heating system may include a pipeline fluid flow portion and a diverted fluid flow portion entering a heat exchanger. The heat exchanger uses heated fluid circulating in a heating line. The heated fluid enters the heat exchanger through a heating line input and flows through the heating line before exiting through a heating line output. The heating line forms a closed loop within the heat exchanger and allows transfer of heated fluid from the exterior of the heat exchanger into an interior compartment of the heat exchanger without leaking heating fluid into the pipeline product itself. A frame supports the fluid heating system and may be used to lift and transport the fluid heating system as an independent system to remote locations.

Referring now to FIGS. 1-2 in more detail, the fluid heating system 100 includes a pipe 103 in fluidic communication with a heat exchanger 117 via heat exchanger inlet 122 and heat exchanger outlet 124. These vessels are in fluidic communication as fluid that enters pipe 103 at the fluid inlet 101 in direction 102 may be diverted through heat exchanger inlet 122 along path 110 into an interior compartment 118 of heat exchanger 117. This same fluid then exits the interior compartment 118 of heat exchanger 117 through the heat exchanger outlet 124 back to the pipe 103 along path 112 and then exits pipe 103 through fluid outlet 105 in the direction 104. The motive force of the fluid is provided by a pipeline 109 when the fluid heating system 100 is installed in line with the pipeline by connecting pipe flanges 120 to corresponding ones of pipeline flanges 111. Such flanges for connecting together sections of pipe are commonly known to those having ordinary skill in the art. Typically, corresponding flanges are bolted together through bolt holes in the flanges and are sealed in a fluid tight fashion using, for example, gaskets or other suitable sealing material. The fluid heating system 100 may be inserted into a section of pipeline using such flanges as connections into the pipeline.

The pipeline carries pressurized fluid which travels therethrough in the direction indicated by directional arrows 102 and 104, which pressure is sufficient to drive the fluid through the heating system 100 when the system is installed in the pipeline 109 as described above. The amount of fluid diverted from the fluid flow in the pipe 103 through the heat exchanger inlet 122 is controlled by valve 106. A handle 107 on the valve may be manually rotated to open and close the valve 106 in a continuously variable fashion, which valve may be a butterfly valve as is commonly known to those having ordinary skill in the art. If the valve 106 is partially opened, then an amount of fluid flowing through a pipeline 109 connected to pipe 103 continues flowing through the pipe 103 as indicated by arrow 108 without diversion into the heat exchanger 117, while a remaining portion is diverted through the heat exchanger as described above. If the valve 106 is completely open then a larger volume of the fluid flowing from an attached pipeline 109 into pipe 103 may travel through the pipe 103 without being diverted into the heat exchanger as compared with a volume of fluid that travels through the pipe 103 when the valve is partially or completely closed. The valve 106 may be of the type that is fitted between pipe flanges 126, 128, such as a wafer and lug style butterfly valve made by C & C Industries of Houston, Tex.

The heat exchanger 117 connected to the pipe 103 includes an exterior housing, or wall 119, a heat exchanger inlet 122, for diverting a fluid flowing in the pipe into the heat exchanger interior compartment 118, and a heat exchanger outlet 124 wherein the fluid exits the heat exchanger back into pipe 103. The interior compartment 118 of the heat exchanger includes a closed heating line 121 for circulating a fluid heated to a temperature greater than the fluid flowing in the pipeline and diverted into the heat exchanger so that heat from the heated fluid may be thermally transferred to the diverted fluid, thereby raising its temperature. Because the heating line is closed, the heated fluid circulating therein does not come into contact with, i.e. does not mix with, the fluid diverted from the pipeline. The heated fluid enters the heating line at a heating line inlet 114 and exits the heating line through a heating line outlet 116. The heating fluid may include propylene glycol, water, oil, or other suitable heating fluids. The heating fluid can be heated using any of a variety of known heating devices such as boilers, electric based heaters, hydronic heaters, or other suitable heating devices, which may be closed system heaters or open air heaters. The heating fluids heated thereby may be transported over heating lines of any convenient length, ranging anywhere from several inches to over one hundred feet, and are connected to heating line input and output 131, 132, respectively.

The heating line input 114 penetrates a wall 119 of the heat exchanger 117 as does the heating line outlet 116. In one embodiment, an overall configuration of the heating line 121 within the heat exchanger interior compartment 118 has a U shape, therefore, the heating line input 114 and output 116 penetrate a common wall of the heat exchanger proximate to each other. The heating line may be made from copper or other metal which, because of the heated fluid flowing through it, becomes heated to a temperature higher than the diverted fluid flowing through the interior compartment 118 of the heat exchanger 117. The diverted fluid flowing through the interior compartment 118 of the heat exchanger 117 is heated by coming into physical contact with the surface of the heating line 121 while flowing through the heat exchanger. One example of a heat exchanger that may be used in the fluid heating system 100 is a straight tube heat exchanger made by Xylem, Inc. of Morton Grove, Ill.

As shown in FIG. 2, in one embodiment, the heat exchanger inlet 122 for connecting the pipe 103 and the heat exchanger 117 is a curved section of pipe 125 joined to a short extension of pipe from the heat exchanger using a pair of bolted flanges 134. Also, in one embodiment, the heat exchanger outlet 124 includes a portion hollow square lower cross member 162, a pipe section 129 between the lower cross member 162 and the pipe 103, and shorter pipe sections connected by a pair of bolted flanges 133 between the heat exchanger 117 and the lower cross member 162. Fluid exiting the heat exchanger 117 flows, as indicated by arrow 112, from the heat exchanger through the pipe sections joined by bolted flange pair 133, through the hollow square lower cross member 162, through pipe section 129 and back into pipe 103 and flowing out of pipe 103 in the direction indicated by arrow 104.

With reference to FIG. 2, a frame is used to support the pipe and heat exchanger that comprises the fluid heating system 100. The frame allows the fluid heating system 100 to be transportable as a unit. A pair of longitudinal members 160 serves as a base for the framed transportable fluid heating system 200. Lower cross members 161, 162, are attached to the top surfaces of longitudinal members 160 near the ends of the longitudinal members, wherein one of the cross members 162 also serves as a portion of the heat exchanger outlet 124 as explained above. Four vertical members 163 are attached to the longitudinal members 160 at the ends of the longitudinal members 160 and extend vertically therefrom. The vertical members 163 are joined together in pairs by two upper cross members 164 attached to the upper ends of vertical members 160. The two upper cross members are joined together by an upper longitudinal member 165. At the upper surfaces of upper cross members 164 proximate to where the upper longitudinal member 165 is attached thereto, a loop is attached for use by a lifting means to lift the entire framed transportable fluid heating system 200 for transport. Such lifting means may include hook and cable assemblies typically employed by mechanical cranes for lifting heavy objects.

Unless otherwise specified herein, most of the pipe, heat exchanger, and frame assemblies described herein are made from a suitable grade of steel. The frame members as shown include rigid steel frame members having a square cross section as exemplary embodiments but are not limited to such embodiments. Moreover, the frame members may be attached in a variety of configurations sufficient to support and transport the fluid heating system described herein. As described herein, the term "attached" or "attaching" may refer to nut and bolt connections, braces, screws, and other suitable mechanical connection, and also may include welding, for example, arc welding components together such as frame members or supports for the pipe and the heat exchanger. In other instances, such as connecting pipe or pipeline sections together, bolted flanges are used for attaching these sections, as described above.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

PARTS LIST 100 fluid heating system
101 fluid inlet
102 fluid flow direction
103 pipe
104 fluid flow direction
105 fluid outlet
106 valve
107 valve handle
108 non-diverted fluid flow
109 pipeline
110 diverted fluid flow
111 pipeline flange
112 returning fluid flow
114 heating line inlet fluid flow
116 heating line outlet fluid flow
117 heat exchanger
118 heat exchanger interior compartment
119 heat exchanger housing
120 pipe flange
121 heating line
122 heat exchanger inlet
124 heat exchanger outlet
125 curved pipe section
126 pipe flange
128 pipe flange
129 support pipe
130 support
131 heating line inlet
132 heating line outlet
133 bolted flange pair
134 bolted flange pair
160 longitudinal cross member
161 first lower cross member
162 second lower cross member
163 vertical member
164 upper cross member
165 upper longitudinal member
166 loop
200 transportable fluid heating system

The invention claimed is:

1. A fluid heating system comprising:
a pipe comprising a fluid input and a fluid output;
a heat exchanger connected to the pipe via a heat exchanger inlet and a heat exchanger outlet, the heat exchanger inlet for diverting a fluid flowing in the pipe into a heat exchanger interior compartment, and the heat exchanger outlet for returning the diverted fluid from the heat exchanger interior compartment back to the pipe;
a heating line within the heat exchanger interior compartment, the heating line for circulating a heated fluid therethrough for heating the diverted fluid in the heat exchanger interior compartment; and
a frame for supporting the pipe and the heat exchanger, the frame including:
a first cross member for supporting a first end of the pipe and heat exchanger, the first end of the pipe and heat exchanger being proximate the fluid input;
a second cross member for supporting a second end of the pipe and the heat exchanger, the second end of the pipe and heat exchanger being proximate the fluid output, wherein the second cross member comprises a portion of the heat exchanger outlet; and
vertical members each attached to the cross members, the vertical members comprising at least one attachment point for securing a lifting means to the frame wherein the fluid heating system may be lifted and transported thereby.

2. The fluid heating system of claim 1, wherein the heating system is configured so that when it is connected to a pipeline having a pressurized fluid flowing therethrough the pipeline fluid flow enters the pipe through the fluid input then is diverted through the heat exchanger inlet into the heat exchanger interior compartment where it is heated, then the heated fluid returns to the pipe through the heat exchanger outlet and exits the pipe through the fluid outlet.

3. The fluid heating system of claim 1, wherein the pipe comprises an adjustable valve between the heat exchanger inlet and the heat exchanger outlet for regulating an amount of fluid entering the pipe through the fluid input that is diverted through the heat exchanger inlet.

4. The fluid heating system of claim 3, wherein the valve comprises a rotatable handle for adjusting a size of an opening through the valve in a continuous fashion for fluid flowing through the pipe.

5. The fluid heating system of claim 1, wherein the pipe comprises a first flange at the fluid input and a second flange at the fluid output, the first and second flanges for connecting the fluid heating system to a pipeline.

6. The fluid heating system of claim 1, wherein the heating line comprises a heating line input through a wall of the heat exchanger and a heating line output through the wall of the heat exchanger, and wherein the heated fluid enters the heating line through the heating line input and exits the heating line through the heating line output.

7. The fluid heating system of claim 6, wherein the heating line input and the heating line output both extend through a common wall of the heat exchanger proximate to each other.

8. The fluid heating system of claim 1, wherein the first cross member comprises first vertical supports each for supporting the first end of either the pipe or the heat exchanger, the second cross member comprises second vertical supports each for supporting the second end of either the pipe or the heat exchanger, and wherein the second vertical supports each comprise a portion of the heat exchanger outlet.

9. A method of heating a fluid flowing in a pipeline, the method comprising:
providing a fluid heating system to an existing supply pipeline, the heating system comprising a pipeline section having opposite ends each connectable to an existing pipeline, the pipeline section having an intermediate valve, passageways forming an inlet and an outlet into a heat exchanger of the heating system, and a frame supporting the heating system, wherein a portion of at least one of the heat exchanger inlet or outlet is integral to the frame;

diverting fluid flowing in the supply pipeline into an interior compartment of the heat exchanger, the diverted fluid having a first temperature;

circulating a heated fluid in a closed heating line within the heat exchanger, wherein the heated fluid comprises a temperature greater than the first temperature and wherein the diverted fluid flows through the heat exchanger in physical contact with the heating line; and returning the diverted fluid from the heat exchanger back to the pipeline through the portion of the frame, wherein the returned fluid is heated to a second temperature that is greater than the first temperature.

10. The method of claim 9, wherein the step of diverting fluid comprises adjusting an opening of the intermediate valve that regulates an amount of the fluid flowing in the pipeline and bypassing the heat exchanger, and the amount of fluid diverted from the pipeline into the heat exchanger.

11. The method of claim 9, further comprising heating the heated fluid in a heating device and delivering the heated fluid to an input of the heating line.

12. The method of claim 11, further comprising returning the heated fluid from the heating line through an output of the heating line back to the heating device.

13. A transportable fluid heating system comprising:

a pipe comprising a fluid input having a first flange thereon, a fluid output having a second flange thereon, the first and second flanges for connecting the pipe to a flanged pipeline;

a heat exchanger connected to the pipe via a heat exchanger inlet and a heat exchanger outlet;

a valve installed in the pipe for diverting a fluid flowing in a pipeline connected to the pipe through the heat exchanger inlet;

a closed heating line within the heat exchanger, the heating line for receiving a fluid heated to a temperature higher than the diverted fluid, the heated fluid circulating through the heating line for transferring heat from the heated fluid to the diverted fluid in the heat exchanger; and a frame comprising a plurality of rigid members connected to each other, to the heat exchanger, and to the pipe, for securely supporting the heat exchanger and the pipe, and for lifting and transporting the fluid heating system, wherein a portion of the heat exchanger outlet is integrated within the frame for returning heated fluid from the heat exchanger back to the pipeline.

14. The transportable fluid heating system of claim 13, wherein the heating line extends through an external wall of the heat exchanger to a heating device for heating the heated fluid.

* * * * *